Figure 1:
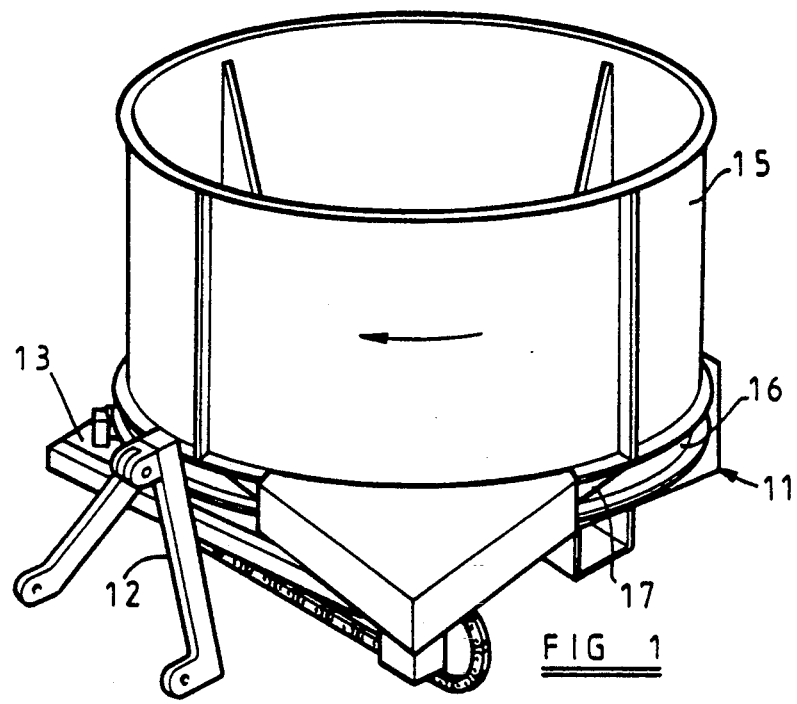

United States Patent [19]
Paul et al.

[11] Patent Number: 5,277,372
[45] Date of Patent: Jan. 11, 1994

[54] BALE SHREDDER

[75] Inventors: Nicholas J. Paul, Near Trowbridge; Edward P. Griffiths, Devizes, both of England

[73] Assignee: Kidd Farm Machinery Limited, Devizes, England

[21] Appl. No.: 546,532

[22] Filed: Jun. 29, 1990

[30] Foreign Application Priority Data

Jul. 1, 1989 [GB] United Kingdom ............... 8915179

[51] Int. Cl.$^5$ .......................................... B02C 13/286
[52] U.S. Cl. .................................. 241/186.4; 241/605
[58] Field of Search ................................ 241/101A, 186.4, 186.2, 101.7, 605

[56] References Cited

U.S. PATENT DOCUMENTS 4,412,659 11/1983 Crawford et al. ............ 241/186.2 X
4,485,976 12/1984 White .............................. 241/186.2

FOREIGN PATENT DOCUMENTS 0121751 10/1984 European Pat. Off. .
0244977 11/1987 European Pat. Off. .
3535437 5/1987 Fed. Rep. of Germany .

*Primary Examiner*—Mark Rosenbaum
*Attorney, Agent, or Firm*—Trexler, Bushnell, Giangiorgi & Blackstone, Ltd.

[57] ABSTRACT

A bale shredder comprising a rotatable tub, closure means at one end of the tub, a bladed rotor having access to the interior of the tub through an aperture in said closure means, the rotor being of smaller diameter than the tub and being rotatable about an axis generally parallel to but spaced from the axis of rotation of the tub and, bale abutment means determining the degree of penetration of blades of said rotor into a bale, the bale abutment means being such that the position of said bale abutment means, in the direction of the axis of rotation of the bladed rotor, can be adjusted relative to the blade tips during operation of the shredder, to control during shredding the degree of penetration of the blade tips into a bale engaging said bale abutment means.

15 Claims, 4 Drawing Sheets

BALE SHREDDER

This invention relates to a device for shredding bales of materials such as, for example, straw, hay or silage.

The formation of rectangular, or, as is becoming more prevalent, large diameter cylindrical, circular cross-section, bales involves compression of the material to form the bale, and thus before the material can be used, for example for animal fodder or bedding, it is necessary to break the baled material into a looser and or more finely divided condition for distribution.

Our European Patent Application No 0244977 illustrates a commercially successful bale shredder having a cylindrical tub of circular cross-section which is rotatable about its longitudinal axis relative to a stationary platform closing one end of the tub. Within the confines of the tub the platform includes an aperture within which a bladed rotor is rotatable. The diameter of the tub significantly exceeds the diameters of the aperture and the bladed rotor, and the axis of rotation of the rotor is substantially parallel to but spaced from the axis of rotation of the tub. The bladed rotor includes a generally centrally disposed bale abutment which limits the penetration of the blades of the rotor into the bale. During assembly of the rotor the height of the bale abutment relative to the blade tips can be adjusted by the use of appropriately dimensioned packing pieces to set the amount by which the blades can penetrate the bale. Blade penetration has proved to be an important factor in relation to the power requirement of the bale shredder. Clearly a bale of silage, where the material is fibrous and damp is more difficult to shred than a straw bale where the stalks of material are dry and brittle. Thus a deeper blade penetration may be chosen for a straw bale than would be appropriate for a silage bale, and too deep a penetration of the blades into a silage bale could give rise to, for example, stalling of the rotor as a result of the power of the shredder being insufficient to drive the blades deeply through the silage bale.

It is contemplated in European Patent Application 0244977 that adjustment of the bale abutment (bale support) can be achieved by means of spacers in the assembly of the bladed rotor, or by means provided on the exterior of the bale shredder. German Patent 3535437 discloses presetting of the penetration of the blades of the cutting rotor into the bale by presetting the height of the rotor relative to the fixed base of the bale shredding apparatus. Adjustment of the degree of blade penetration by presetting rotor or bale abutment height is extremely useful but requires a judgement to be made with regard to bales which are to be shredded, and an appropriate rotor or bale abutment adjustment to be effected prior to the commencement of the shredding operation. Thus considerable knowledge and experience on the part of the operator is needed in order to achieve the optimum positioning of the bale abutment prior to shredding, and it is an object of the present invention to obviate this disadvantage. Moreover adjustment of the rotor height as suggested in German Patent 3535437 is disadvantageous in that the use of a height adjustable rotor renders extremely difficult the control of the fit of the rotor assembly within the rotor housing within which the rotor assembly rotates; this fit being of particular importance in relation to the discharge of chopped or shredded material from the apparatus. Presumably for this reason German Patent 3535437 discloses the provision of a separate blower unit below the rotor with a complex housing to accommodate height adjustment.

In accordance with the present invention there is provided a bale shredder comprising a rotatable tub, closure means at one end of the tub, a bladed rotor having access to the interior of the tub through an aperture in said closure means, the rotor being of smaller diameter than the tub and being rotatable about an axis generally parallel to but spaced from the axis of rotation of the tub, bale abutment means associated with said rotor, and mounting means for said bale abutment means whereby the position of said bale abutment means, in the direction of the axis of rotation of the bladed rotor, can be adjusted relative to the blade tips during operation of the shredder, to control the degree of penetration of the blade tips into a bale engaging said bale abutment means.

Preferably said mounting means provides stepless adjustment of the position of the bale abutment means between predetermined limit positions.

Desirably said bale abutment means is freely rotatable about an axis coextensive with the axis of rotation of the bladed rotor.

Desirably the bladed rotor includes a hollow drive shaft and the means mounting the bale abutment includes a support shaft having its axis coextensive with the axis of said hollow shaft and slidably received within the hollow shaft.

Preferably the prime mover for the bale abutment means adjustment is hydraulic.

Desirably said bale abutment means comprises a plurality of height adjustable abutment members spaced around said closure means.

Conveniently said abutment members are movable in unison and through the same distance for height adjustment.

Preferably said abutment members are freely rotatable discs.

Conveniently said discs are mounted with their axes of rotation inclined towards the axis of rotation of the tub.

Figure 2:
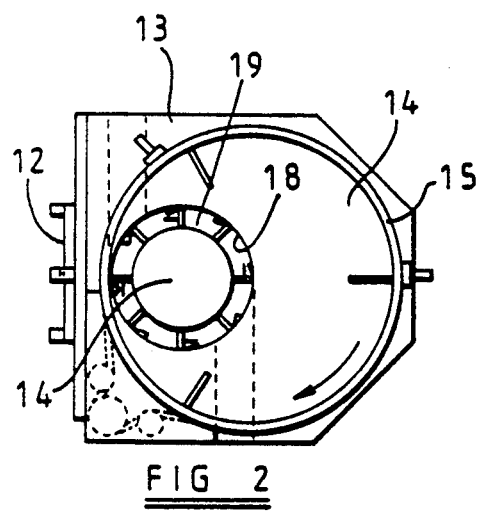
Figure 3:
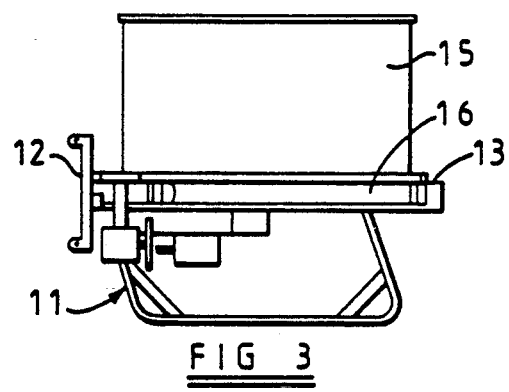
Figure 4:
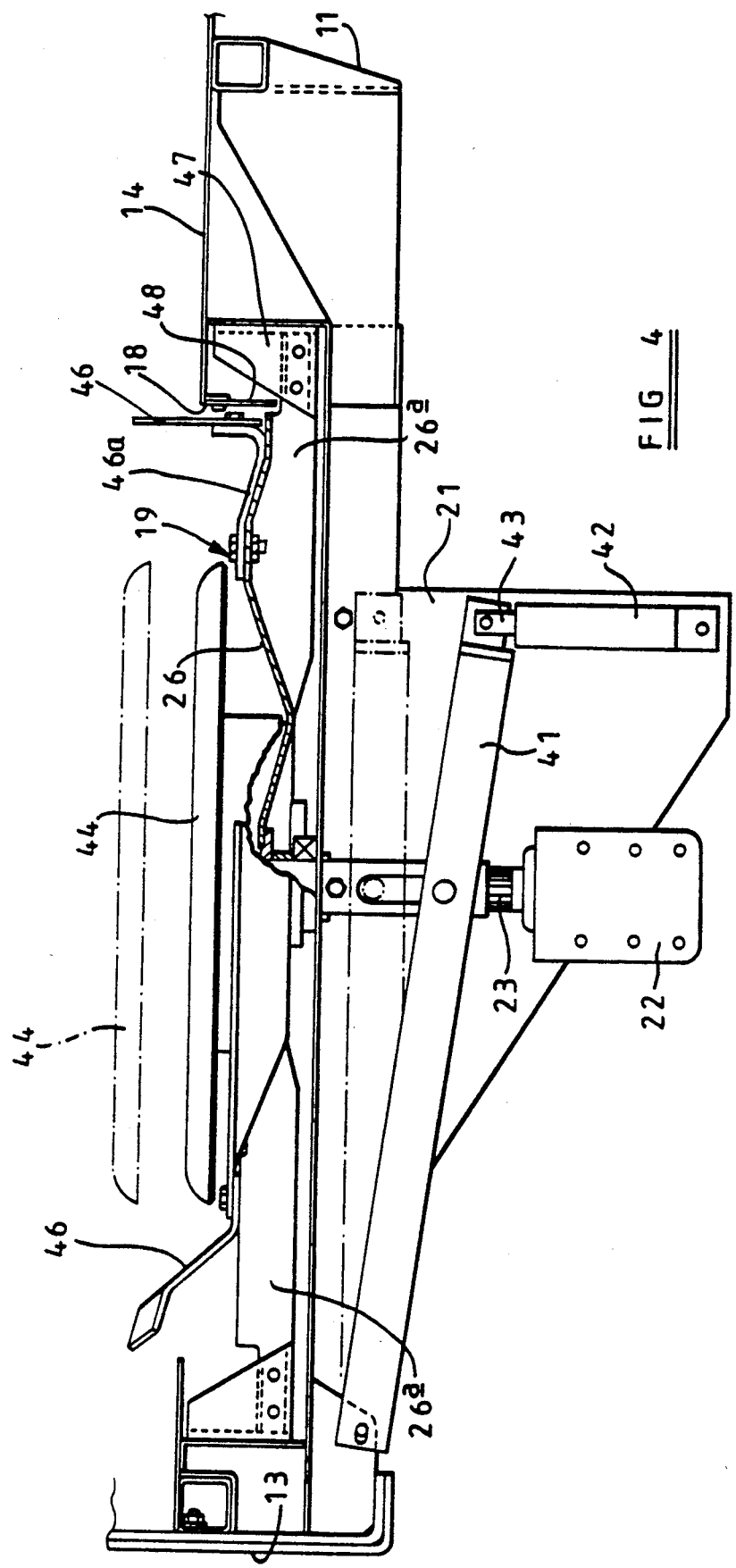
Figure 5:
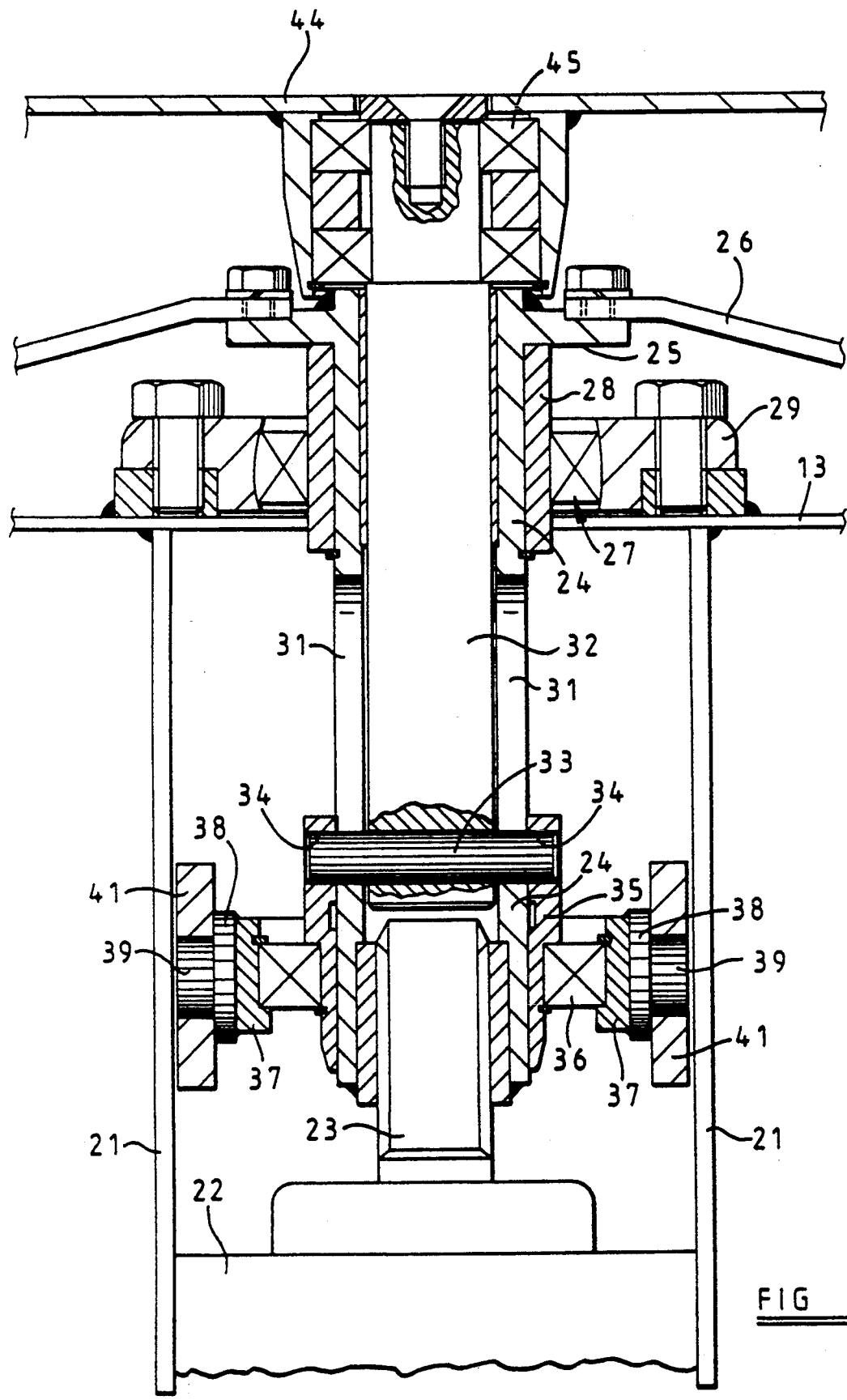
Figure 6:
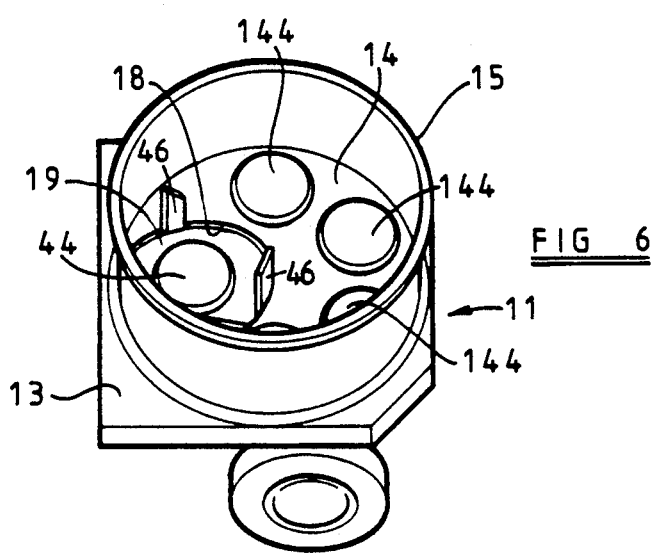
Figure 7:
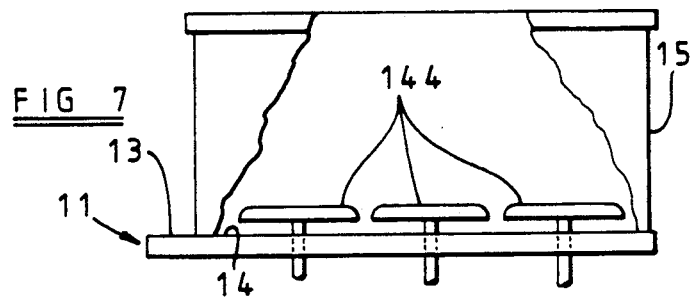
Figure 8:
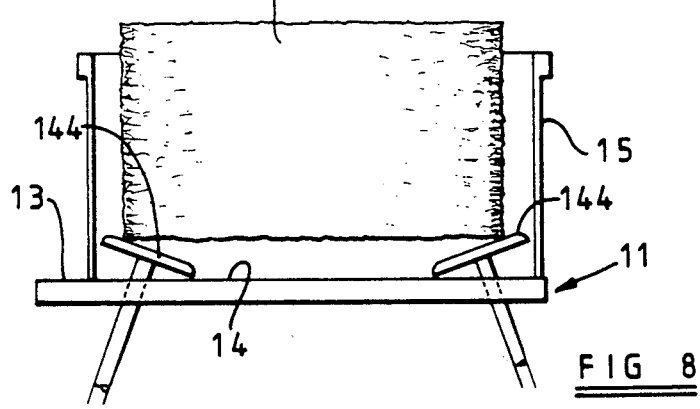

One example of the invention is illustrated in the accompanying drawings wherein;

FIG. 1 is a diagrammatic perspective view of a bale shredder,

FIGS. 2 and 3 are plan, and side elevational, views respectively to a reduced scale of the shredder illustrated in FIG. 1, FIG. 4 is an enlarged, side elevational view, partly in section, of the bladed rotor and associated structure of the shredder, FIG. 5 is an enlarged longitudinal sectional view of the rotor and bale abutment structure of the shredder, FIGS. 6 and 7 are diagrammatic perspective and side elevational views respectively of a modification of the bale shredder of FIGS. 1 to 5, and, FIG. 8 is a view similar to FIG. 7 of a further modification.

Referring first to FIGS. 1 to 5 of the drawings the bale shredder includes a support frame 11 through which the shredder can stand on the ground, the frame 11, if desired, being provided with wheels to facilitate transport of the shredder. The frame 11 incorporates a coupling 12 for connection to the conventional three point linkage of an agricultural tractor whereby the tractor may be used to manoeuvre the shredder as desired.

Supported on the frame 11 is a fixed housing 13 including a generally planar surface 14 upstanding from which is a rotatable, cylindrical tub 15 of circular cross-section. The tub is supported by the housing 13 through the intermediary of rollers, rotatable about axes parallel to the surface 14, and engaged in a circumferential channel 16 disposed around one end of the tub 15. A drive belt 17 or chain extends around the tub within the channel 16 and is driven to rotate the tub relative to the housing 13. The surface 14 thus closes the end of the tub 15 which is lowermost when the tub 15 has its rotational axis vertical.

Supported by the housing 13 and disposed in a circular aperture 18 in the surface 14 is a bladed rotor assembly 19. As is apparent from FIG. 2 the internal diameter of the tub 15 is substantially larger than the diameter of the bladed rotor 19, and conveniently, as shown, the tub diameter is double the rotor diameter. The rotor 19 is driven for rotation, and its rotational axis is generally parallel to but spaced from, the axis of rotation of the tub. It is intended that the rotor will rotate at a speed greatly in excess of the rotational speed of the tub, but in the same direction. However while it is preferred that the tub and the rotor rotate in the same direction it is to be understood that if desired contra-rotation could be arranged, by rotating the tub in the opposite direction.

Although the drive arrangement of the tub 15 and rotor 19 can take a number of forms it is preferred to drive the rotor 19 through a gearbox from the power take-off (PTO) of an agricultural tractor while the tub 15 is driven through the chain or belt 17 by an hydraulic motor receiving hydraulic power from the hydraulic system of the tractor. In an alternative the tub 15 is also driven from the tractor PTO by way of a further gearbox the output of which drives the chain or belt 17 through a further chain or belt connection if necessary. The drive arrangment of the rotor 19 is described in more detail hereinafter.

The structure and operation of the bladed rotor and allied components is best understood with reference to FIGS. 4 and 5.

Disposed beneath the aperture 18, and welded to the frame 11 are first and second spaced and parallel brackets 21 between which is mounted a gearbox 22 (or, in an alternative construction, an hydraulic motor) having its output shaft 23 directed upwardly towards the aperture 18 with its axis passing through the centre of the aperture 18. The output shaft 23 extends into one end of a hollow shaft 24, the hollow shaft 24 being coextensive with the output shaft 23 and there being a splined coupling therebetween so that the shaft 24 rotates with the shaft 23. At its end remote from the shaft 23 the shaft 24 includes an integral outwardly extending peripheral flange 25 to which a rotor disc 26 is bolted. Adjacent the flange 25 the shaft 24 carries the inner race 28 of a roller bearing assembly 27, conveniently a roller bearing assembly, the outer race 29 of which is bolted to the housing 13, the bearing assembly 27 also acting as a thrust bearing supporting the weight of the shaft 24 and rotor disc 26. Intermediate its ends the shaft 24 is formed with a pair of diametrically opposed, longitudinally extending, closed ended parallel slots 31 and slidably disposed within the hollow shaft 24 is a solid shaft 32. A transversely extending steel pin 33 is received as a close fit in a transverse bore at the lower end of the shaft 32 and the ends of the pin 33 project through the slots 31 respectively to be received as a close fit in respective oppositely positioned bores 34 in the wall of a collar 35 encircling the lower end region of the shaft 24. The collar 35 defines the inner race of a roller bearing 36 the outer race 37 of which is anchored within a trunnion ring 38 having integral, diametrically opposed, outwardly extending trunnions 39 rotatably received in corresponding apertures in respective elongate levers 41. The levers 41 are parallel to one another and receive the trunnions 39 intermediate their ends respectively. Each lever 41 is pivotally connected at one end to the frame 11 of the shredder, and at its opposite end to the piston 43 of an hydraulic ram 42 the cylinder of which is pivotally connected to the brackets 21. The axes of pivotal movement of the ram 42 relative to the brackets 21; the piston 43 relative to the levers 41; the trunnions 39 relative to the levers 41; and the levers 41 relative to the frame 11 are all parallel.

The collar 35 is slidable on the shaft 24, and it will be recognised that operation of the ram 42 to cause extension of the piston 43 pivots the levers 41 relative to the frame 11 so sliding the collar 35 on the shaft 24 in a direction away from the gearbox 22, the pin 33 traversing the length of slots 31 and carrying the shaft 32 with it. Thus the shaft 32 is caused to slide within the shaft 24 thereby increasing the amount by which the end of the shaft 32 remote from the gearbox 22 protrudes from the shaft 24. The movement of the collar 35 and thus the ring 38 is rectilinear (by virtue of slots 31) and to accommodate thus the coupling of the levers 41 relative to the frame 11 is sufficiently loose to permit limited longitudinal movement of the levers 41.

At its end remote from the gearbox 22 the shaft 32 supports a bale abutment disc 44 in the form of a shallow, inverted dish. The disc 44 is coupled to the free end of the shaft 32 through a bearing arrangement 45 which permits the disc 44 to rotate freely relative to the shaft 32. It will be recognised therefore that when the output shaft 23 of the gearbox 21 is rotating the shafts 24 and 32 rotate with the shaft 23 and of course the rotor disc 26 rotates with the shaft 24. The bale abutment disc 44 is not constrained to rotate with the shaft 32, although in the absence of a bale engaging the disc 44 it may rotate with the shaft 32 by virtue of drag in the bearing 45. The spacing of the disc 44 from the disc 26 can be adjusted by operation of the ram 42 at any time, for example while the disc 26 is driven, and thus adjustment of the position of the disc 44 relative to the disc 26 is not dependent upon the disc 26 being stationary.

The disc 26 can, if desired, be a planar component carrying blades 46 at its outer periphery. However, it is preferred that the disc 26 is a component shaped to generate a radially outward flow of air as it rotates. The disc 26 includes radially extending paddles or fins 26a which assist in the generation of a significant radially outward air flow as the disc 26 rotates, the air being drawn in towards the lower side of the disc 26 through the housing 13.

A plurality of blades 46, conveniently three in number, (six in alternative construction) are equiangularly disposed around the outer periphery of the disc 26 and are secured thereto by being bolted to brackets 46a which are secured to the disc 26 by bolts. Each blade is generally in the form of planar member upstanding from the periphery of the disc 26 and having a upwardly directed apex. Thus when the shredder is disposed with the surface 14 of the housing 13 horizontal, and with the tub 15 extending upwardly from the surface 14 then the disc 26 is slightly below the level of the surface 14 and the blades 46 project upwardly through the aperture 18 so that the apical free ends of the blades are disposed above the level of the surface 14. As is apparent from FIG. 4 the bale abutment disc 44 lies within the circle defined by the free ends of the blades 46 and its height relative to the blades 46 is adjustable so that the degree of penetration of the blades 46 into a bale disposed within the tub 15 can be controlled steplessly between upper and lower limit positions. Desirably the upper limit position of the disc 44 is such that the bale would be supported clear of the blade tips.

The free end regions of the blade 46 are angled so that their leading edge is the highest point and as material is cut from the bale by the blades 46 the radially outward airflow and the centrifugal effect generated by rotation of the rotor 19 drives the cut material outwardly and downwardly into a cylindrical chamber defined by the housing 13 beneath the surface 14 within which the rotor rotates and wherein the cut material is entrained in the air flow generated by rotation of the rotor. The cylindrical chamber has a pair of diametrically opposed tangential outlets through which the air is blown carrying with it the cut material and a third, similar, tangential outlet intermediate the opposed outlets. If a finer chopping action than can be achieved with the blades 46 alone is needed, then stationary blades 48 can be disposed around the periphery of the aperture 18. The blades 48 extend downwardly towards the base of the rotor chamber and cooperate with the rotor 19 to chop more finely the material shredded from the bale by the blades 46. The fins 26a may carry flanges 47 adjacent the periphery of the cylindrical chamber to enhance the air flow.

The ram 42 receives pressurized hydraulic fluid from any convenient source, for example an hydraulic motor of the agricultural tractor, through the intermediary of a control valve. Conveniently the ram 42 is double acting, and the control valve, which is manually operable can supply pressurized hydraulic fluid to either end of the ram to cause powered extension or powered retraction of the piston, but in a preferred embodiment the ram 42 is a simple, single acting ram for moving the levers 41 in one direction, their return movement being under the action of springs and/or gravity. It will be recognised that an unskilled operator may not recognise the requirements of baled material which he is attempting to shred. Thus he should load the baled material into the tub 15 with the bale abutment disc 44 in its outer limit position, that is to say such that the bale will be supported by the disc 44 fractionally above the tips of the blades 46. The operator will then initiate rotation of the tub and the rotor, and will control gradual retraction of the piston of the ram 42 to withdraw the shaft 32 gradually into the shaft 24 so bringing the bale gradually into contact with the tips of the blades 46. The operator will then be able to determine, from the sound of the apparatus, and the flow of shredded material from one or both outlets whether or not the operation is proceeding satisfactorily. In particular he will be able to tell whether or not the shredding action is becoming overloaded and the rotor is tending to stall, by virtue of the blades cutting too deeply into the bale. If this occurs the operator can reverse the movement of the shaft 32 thus reducing the depth of penetration of the blades 46 into the bale. Thus no prejudgment on the part of the operator is needed, and the operator can effect appropriate settings during the shredding operation.

It will be understood that a bale or bales in the tub 15 will be moved relative to the rotor 19 by the rotation of the tub and will move towards the abutment disc 44 primarily under gravity. As shown the tub can be provided with internal axially extending flanges for improving the grip between the wall of the tub and the bale or bales so that rotation of the baled material with the tub is ensured.

It will be recognised that if it is desired to produce a bale shredder wherein the tub can rotate in either direction then it may be convenient to drive the tub by way of an hydraulic motor so that reverse rotation can be effected simply by reversing the position of a change-over valve associated with the motor so as to reverse the flow of hydraulic fluid to the motor. Furthermore, although the mechanism described above, and illustrated in particular in FIGS. 4 and 5, for stepless adjustment of the position of the bale abutment disc 44 is preferred, other mechanisms could be provided. For example, it would be possible to produce an hydraulic adjustment arrangement wherein the shaft 32 is effectively the piston rod of an hydraulic ram slidable and rotatable within a hollow shaft equivalent to the shaft 24, the hollow shaft being driven from a gearbox having its output shaft positioned with its axis spaced from the axis of the hollow shaft. For example the output shaft of the gearbox could be parallel to the hollow shaft and in driving engagement therewith via spur gears, or could be at an angle and in driving engagement by way of appropriate bevel gears.

Naturally given the concept of being able to adjust the position of the abutment disc 44 steplessly during operation of the shredder numerous mechanical arrangements other than the preferred arrangement described above could be designed for achieving the stepless adjustment. Moreover, although it is desirable that the adjustment is stepless between overall limit positions, the stepless nature is not essential and an adjustment range comprising a series of closely spaced stable positions could be substituted if desired.

FIGS. 6 and 7 illustrate a modification applicable to all of the bale shredder variants described above in relation to FIGS. 1 to 5, in which additional height adjustable bale abutment discs 144 are introduced around the base surface 14. The discs 144 can have individual lifting mechanisms or a common mechanism linked to or simply controlled by the disc 44. For example where the disc 44 is hydraulically operated then the discs 144 can be operated in conjunction therewith by one or more hydraulic rams receiving hydraulic power from the same source as the disc 44. Desirably the discs 144 will be freely rotatable, and FIG. 8 illustrates a variation in which the height adjustable discs 144 are positioned with their rotational axes inclined towards the axis of rotation of the tub 15 to facilitate rotation to the bale 100 relative to the surface 14. It will be recognised that height adjustment of the inclined discs 144 may involve movement of the discs about axes parallel to the rotor axis or movement parallel top their individual axes of rotation dependent upon the supporting and adjustment mechanism which is chosen. It view of the additional mechanical complexity which would be involved it is unlikely that the disc 44 concentric with the rotor 19 would be inclined.

Although it is considered preferable to provide a bale abutment disc 44 concentric with the rotor 19 there may be applications in which the height adjustable discs 144 are provided in place of, rather than in addition to the disc 44 concentric with the rotor. Moreover while it is preferable in normal use to move the discs 44 and 144 in unison and through the same distance there may be applications where it would be advantageous to provide individual adjustment of the discs. It will be noted that FIG. 4 is a composite view in that it shows a preferred blade construction 46 at the right hand side of the view and an alternative, lazy-Z, blade configuration at the left hand side of the view.

I claim:

1. A bale shredder comprising a rotatable tub, closure means at one end of the tub, a bladed rotor having access to the interior of the tub through an aperture in said closure means, the rotor being of smaller diameter than the tube and being rotatable about an axis generally parallel to but spaced from the axis of rotation of the tube and, bale abutment means determining the degree of penetration of blades of said rotor into a bale, mounting means for said bale abutment means whereby the position of said bale abutment means, in the direction of the axis of rotation of the bladed rotor, can be adjusted relative to the blade tips during operation of the shredder, to control during shredding the degree of penetration of the blade tips into a bale engaging said bale abutment means; wherein said bale abutment means is freely rotatable about an axis coextensive with the axis of rotation of the bladed rotor.

2. A shredder as claim in claim 1 wherein said mounting means provides stepless adjustment of the position of the bale abutment means between predetermined limit positions.

3. A shredder as claimed in claim 11 wherein the bladed rotor includes a hollow drive shaft and the means mounting the bale abutment means includes a support shaft having its axis coextensive with the axis of said hollow shaft and slidably received within the hollow shaft.

4. A shredder as claimed in claim 1 wherein said bale abutment means comprises a plurality of height adjustable abutment members spaced around said closure means.

5. A shredder as claimed in claim 4 wherein the abutment members are movable in unison and through the same distance for height adjustment.

6. A shredder as claimed in claim 4 wherein said abutment members are freely rotatable discs.

7. A shredder as claimed in claim 6 characterized in that said discs are mounted with their axes of rotation inclined towards the axis of rotation of the tub.

8. A shredder as claimed in claim 1 or claim 4 wherein the prime mover for the bale abutment means adjustment is hydraulic.

9. A bale shredder comprising a rotatable tube, closure means at one end of the tube, a bladed rotor having access to the interior of the tub through an aperture in said closure means, the rotor being of smaller diameter than the tube and being rotatable about the axis generally parallel to but spaced from the axis of rotation of the tube and, bale abutment means determining the degree of penetration of blades of said rotor into a bale, mounting means for said bale abutment means whereby the position of said bale abutment means, in the direction of the axis of rotation of the bladed rotor, can be adjusted relative to the blade tips during operation of the shredder, to control during shredding the degree of penetration of the blade tips into a bale engaging said bale abutment means; wherein the bladed rotor includes a rotatable drive shaft and the means mounting the bale abutment means includes a support shaft having its axis coaxial with the axis of said drive shaft, and the drive shaft and the support shaft are relatively axially slidable.

10. A bale shredder comprising a rotatable tub, closure means at one end of the tube, a bladed rotor having access to the interior of the tub through an aperture in said closure means, the rotor being of smaller diameter than the tube and being rotatable about an axis generally parallel to but spaced from the axis of rotation of the tube and, bale abutment means determining the degree of penetration of blades of said rotor into a bale, mounting means for said bale abutment means whereby the position of said bale abutment means, in the direction of the axis of rotation of the bladed rotor, can be adjusted relative to the blade tips during operation of the shredder, to control during shredding the degree of penetration of the blade tips into a bale engaging said bale abutment means; wherein the bladed rotor includes a hollow drive shaft and the means mounting the bale abutment means includes a support shaft having its axis coextensive with the axis of said hollow shaft and slidably received within the hollow shaft.

11. A bale shredder comprising a rotatable tube, closure means at one end of the tub, a bladed rotor having access to the interior of the tub through an aperture in said closure means, the rotor being of smaller diameter than the tub and being rotatable about an axis generally parallel to but spaced from the axis of rotation of the tub and, bale abutment means determining the degree of penetration of blades of said rotor into a bale, mounting means for said bale abutment means whereby the position of said bale abutment means, in the direction of the axis of rotation of the bladed rotor, can be adjusted relative to the blade tips during operation of the shredder, to control during shredding the degree of penetration of the blade tips into a bale engaging said bale abutment means; wherein said bale abutment means comprises a plurality of height adjustable abutment members spaced around said closure means.

12. A shredder as claimed in claim 11 wherein the abutment members are movable in unison and through the same distance for height adjustment.

13. A shredder as claimed in claim 11 wherein said abutment members are freely rotatable discs.

14. A shredder as claimed in claim 13 characterized in that said discs are mounted with their axis of rotation inclined towards the axis of rotation of the tub.

15. A shredder as claimed in claim 11 wherein the prime mover for the bale abutment means adjustment is hydraulic.

* * * * *